July 7, 1964  H. A. HEATH ETAL  3,140,032
PNEUMATIC STOCK FEED ARRANGEMENT
Filed June 5, 1962  3 Sheets-Sheet 1

INVENTORS.
Harry A. Heath
Loren D. Porter
By: Snow and Denns
Attys.

INVENTORS
Harry A. Heath
Loren D. Porter
By Snow and Benno
Attys.

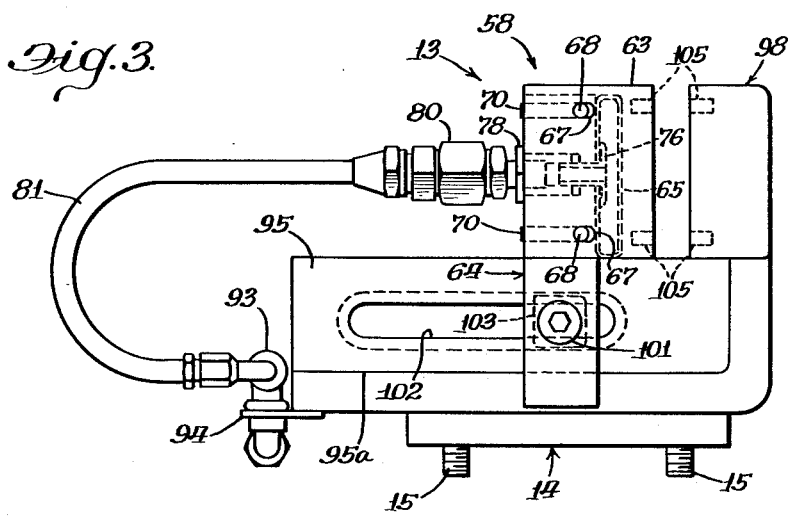
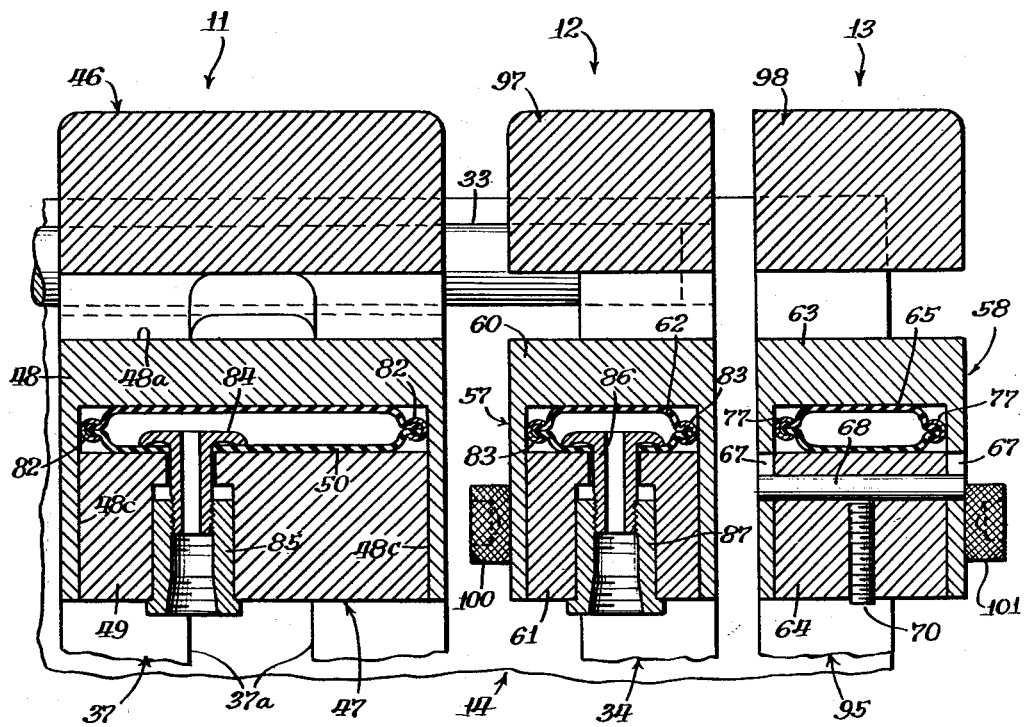

United States Patent Office 3,140,032
Patented July 7, 1964

3,140,032
PNEUMATIC STOCK FEED ARRANGEMENT
Harry A. Heath and Loren D. Porter, Kalamazoo, Mich., assignors to Power Control Products, Inc., a corporation of Illinois
Filed June 5, 1962, Ser. No. 200,195
18 Claims. (Cl. 226—141)

This invention relates generally to pneumatically operated stock feed arrangements, and more particularly to pneumatically operated stock feeding devices of the type additionally serving to grip the stock in a vise arrangement to hold the stock for working thereon by some tool.

A primary object of the present invention is to provide a novel pneumatically operated stock feed and vise arrangement which is relatively simple in construction and highly accurate in operation.

A further object is to provide a novel arrangement of a pneumatically operated stock feed arrangement with a pneumatically operated vise for gripping and securely holding any stock while the stock is worked by some tool.

It is a further object to provide novel adjusting means for varying the incremental length of stock delivered to the vise portion and for varying the opening of the vise portion to accommodate different widths of stock in any of the arrangements of the foregoing paragraphs.

It is another object to provide a novel double holding jaw arrangement in a vise construction of any of the foregoing paragraphs which will permit a cutting tool such as a saw to enter between the vise jaws and cut through and below stock held by the vise jaws.

It is still another object to provide novel air responsive means in the vise or jaw members of any of the arrangements of the preceding paragraphs which will produce a substantially greater holding force for any given gripping surface area of the vise or jaw members than heretofore known in the art.

A feature of the present invention is a novel and unique vise bladder made from a resilient hose material.

Other objects and features of the invention will be apparent upon a perusal of the following specification and drawings in which:

FIGURE 3 is an end elevational view of the structure shown in FIGURES 1 and 2 looking from the vise end of the structure; and FIGURE 4 is a cross sectional view of the structure shown in the drawings and taken substantially along the line 4—4 of FIGURE 1.

Figure 1:
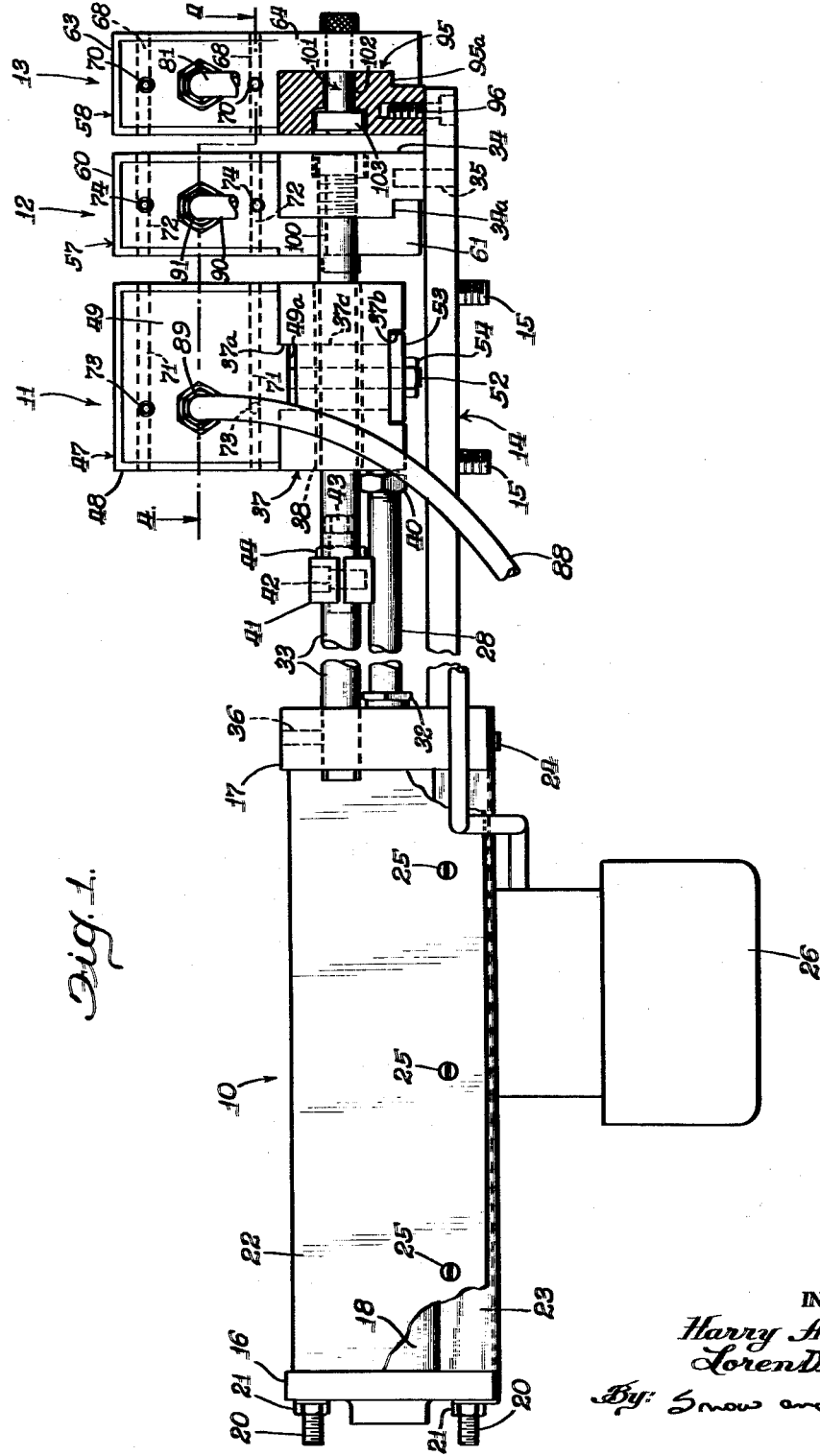
FIGURE 1 is a side elevational view of an air operated stock feed and vise arrangement constructed according to the invention.

The present embodiment is the preferred embodiment, but it is to be understood that changes can be made in the present embodiment by one skilled in the art without departing from the spirit and scope of the present invention.

Generally, the construction as shown in the drawings comprises a reciprocating air cylinder assembly, a moving jaw and a pair of stationary vise jaws. The entire construction is carried on a rectangular plate which is provided with a plurality of depending studs for mounting the construction in cooperation with some tool.

Stock of some length greater than the total length of the jaws is delivered to the arrangement from the head end of the air cylinder assembly. The stock then passes through the gripping portions of the movable jaw and thence through the gripping portions of the pair of stationary vise jaws. The movable jaw is substantially wider than either stationary jaw and the stationary jaws are constructed as mirror images of each other. Each end of the base portion of the movable jaw is journaled on a rod for reciprocating longitudinal movement therealong. The pair of rods are secured between the rod end of the air cylinder assembly and the base portion of one of the stationary jaws. The piston rod of the air cylinder assembly is connected to the base portion of the movable jaw for moving the moving jaw in a reciprocating movement on the pair of rods responsive to the operation of the air cylinder assembly. A stroke adjustment bar is also carried on the pair of rods and is positioned between the movable jaw and the rod end of the air cylinder assembly. The stroke adjustment bar functions to limit the movable jaw on its return stroke to some preselected position. The stroke adjustment bar also carries a unique and simple vernier adjustment for finely determining the exact return stroke limit that is desired. The limit of the forward stroke of the movable jaw is determined by a bumper carried in the air cylinder assembly at the rod end thereof and engaged by the air piston in the extreme forward position of the movable jaw.

The base portion of the movable jaw is a substantially rectangular member having a longitudinally centrally disposed slot both in the upper and lower surfaces thereof with a further slot formed vertically through the base portion between the upper and lower slots. The remainder of the movable jaw comprises two stock gripping jaw portions, one which is fixed on the base portion and the other which may be selectively fixed at a selected position on the base portion longitudinally thereof. The selectively fixed jaw portion is operable within a limited range to cause stock to be gripped or clamped between the two jaw portions. The selectively fixed jaw portion of the movable jaw comprises a face plate member, a backup member and a bladder. The backup member is a substantially rectangular block with a depending central portion which permits the backup member to rest upon the base member of the movable jaw with the depending portion of the backup member disposed in the upper slot of the base member of the movable jaw. A stud extends from the underside of the backup member through the base member to the underside thereof. A plate and a nut are carried on the lower end of the stud to permit the backup member to be securely fixed at any position along the base member. The face plate member is formed in a somewhat boxlike shape with an open bottom and an open back. The face plate member cooperates with the backup member to substantially cover the backup member, and the vertical space between the face plate member and the front of the backup member is occupied by the air bladder which provides for the operation of the movable jaw when air under pressure is delivered to the bladder. A certain pin arrangement limits the range of movement of the face plate member relative to the backup member.

The stationary jaws differ in construction from the movable jaw primarily in the shape of the base members and the shape of the backup members of the selectively fixed jaw portions. The base member of each stationary jaw is secured to the base plate by dowels and bolts. The backup member of each selectively fixed jaw portion of each stationary jaw is provided with a depending flange which is disposed on one side of the base member. The base member is further provided with a certain horizontally disposed slot arrangement and a certain bolt and plate assembly is carried through that slot and through the depending flange portion of the backup member of the selectively fixed jaw portion to permit the selectively fixed jaw portion to be fixed in any desired spaced relationship to the fixed jaw portion thereof to accommodate stock of different widths.

The air cylinder assembly carries a control valve assembly on the underside thereof for operating the air cylinder assembly and the movable and stationary jaws. Any suitable type of air control valve known in the art may be used to deliver and exhaust air to and from the air cylinder assembly and the movable and stationary jaws. The general sequence of operation may be described with the assumption that the movable jaw is initially in its forwardmost position and that a length of stock is disposed between the fixed and selectively fixed jaw portions of the movable and stationary jaws. Air under pressure is then supplied from the valve means to the pair of stationary jaws to cause a firm gripping of the stock. The stock may then be worked by some tool such as a saw which may cut the stock by a cutting operation thereon between the pair of stationary jaws. While the stock is being cut, the bladder in the movable jaw is connected to exhaust and air under pressure may then be delivered to the rod end of the air cylinder assembly to cause a return of the movable jaw to the rearward limit determined by the stroke adjustment bar. As the movable jaw is moved on the return stroke the surfaces of the movable jaw which engage the stock may freely slide along the stock. When the cutting operation on the stock is completed some form of control signal is transmitted to the valve means to firstly cause air under pressure to be delivered to the movable jaw to cause its operation to firmly grip the stock, to secondly exhaust the pair of stationary jaws whereby the stationary jaws will release their grip on the stock, and to thirdly apply air under pressure to the head end of the air cylinder assembly to cause the movable jaw to be moved on its forward stroke to advance a new portion of the stock into the pair of stationary jaws. As the uncut stock is advanced, the piece which has been cut therefrom is pushed out of the forwardmost stationary jaw. At the end of the forward stroke of the movable jaw, the valve means is operated to deliver air under pressure to the pair of stationary jaws to cause those jaws to firmly grip the stock for further work on the stock by the tool means. The valve means may then exhaust the movable jaw to release the stock and again air under pressure may be delivered to the rod end of the air cylinder assembly to return the movable jaw to its rearwardmost position in engagement with the stroke adjustment bar. From the foregoing it may be seen that the present invention operates to incrementally deliver a length of strip stock to the stationary jaws whereupon the stationary jaws firmly grip the stock for working thereon by some tool means with the cycle being repeated upon the completion of the work of the tool on each incrementally advanced portion of the stock. With the present invention, each incrementally worked portion of stock will be substantially identical in length to every other incrementally worked portion of stock for any one setting of the stroke adjustment bar.

In detail, the structure of the invention as shown in the drawings comprises an air cylinder assembly 10, a movable jaw 11, a stationary jaw 12 and a stationary jaw 13 cooperatively carried as a unit on a base plate 14. The base plate 14 carries a plurality of depending studs 15 by which the feed and vise arrangement of the subject invention may be mounted in cooperation with some tool means.

The air cylinder assembly 10 comprises a plate 16 at the head end thereof and a plate 17 at the rod end thereof. The plate 17 is secured to the rearward end of the base plate 14 by any suitable means. An air cylinder 18 is carried between the plates 16 and 17 by four tie rods 20. The forward ends of the tie rods 20 are threaded into suitable tapped holes provided in the rearward surface of the plate 17, and the rearward ends of the tie rods extend through holes provided in the plate 16. Nuts 21 threaded on the rearward ends of the tie rods 20 permit the assembly of the two plates 16 and 17 and the air cylinder 18 to be secured firmly together as an air tight unit. The air cylinder assembly 10 further comprises a cover assembly of an upper cover portion 22 and a lower cover portion 23. The lower cover portion 23 is formed as a plate having upturned sides and an upturned flange at the rearward end thereof. A pair of holes is provided through the upturned rearward flange of the lower cover portion to permit the rearward end of the lower cover portion 23 to be carried on the lower pair of tie rods 20. The forward end of the lower cover portion 23 is secured to the underside of the plate 17 by fasteners 24. The upper cover portion 22 is U-shaped and is mounted over the cylinder 18 and between the plates 16 and 17. The lower marginal edges of the upper cover portion 22 overlap the upturned sides of the lower cover portion 23 and fasteners 25 secured through the lapped portions of the upper and lower cover portions 22 and 23 secure the upper cover portion 22 in place.

Any suitable type of valve assembly 26 which will properly control the operation of the invention is conveniently secured to the underside of the lower cover portion 23 to depend therefrom.

Figure 2:
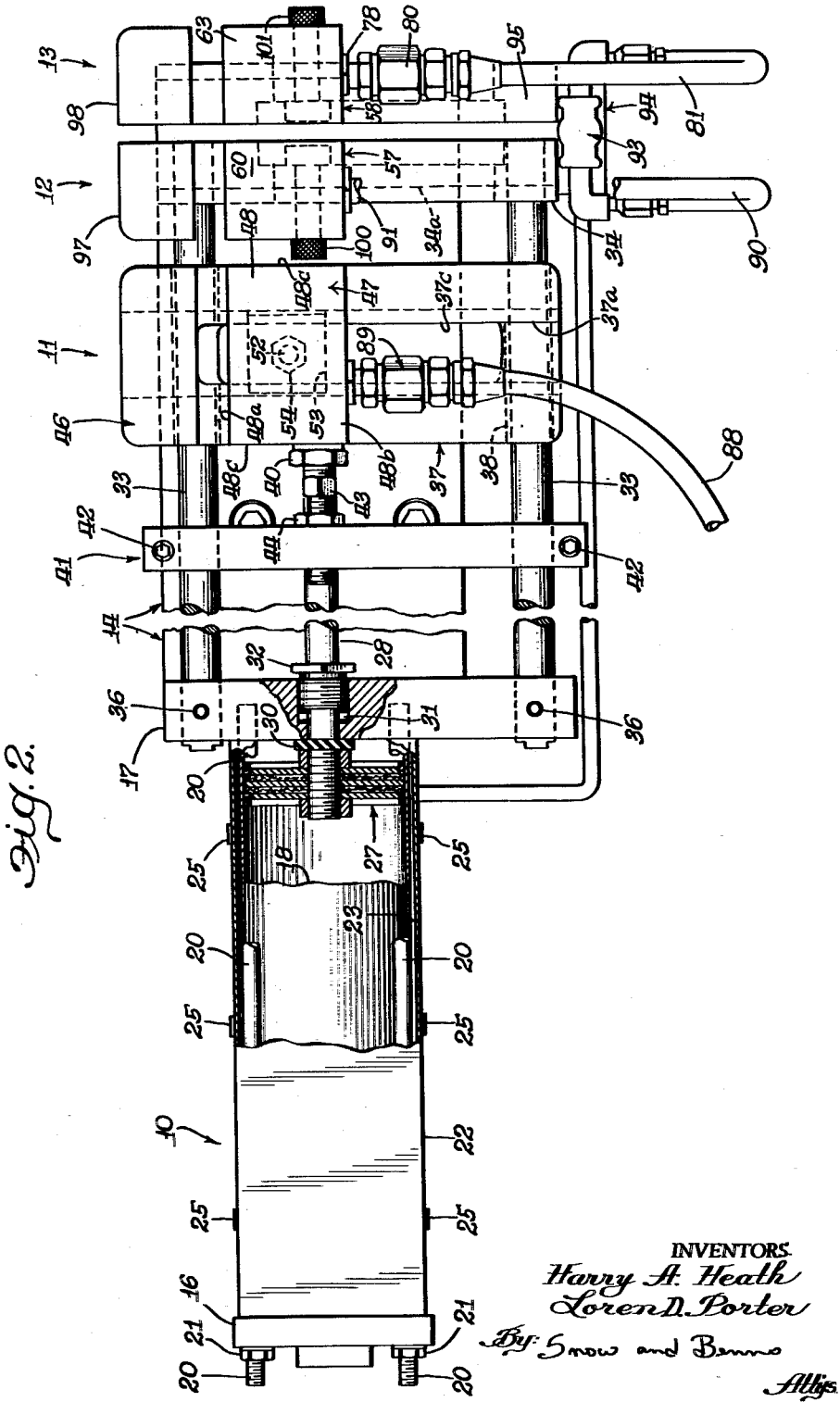
FIGURE 2 is a top plan view of the structure shown in FIGURE 1.

The air cylinder assembly 10 further comprises a piston 27 and a piston rod 28. The piston rod 28 is carried through an opening in the plate 17, and the piston 27 is secured to the rearward end of the piston rod 28. The piston 27 may be formed in any manner known in the art for effective sliding reciprocating movement in the cylinder 18 by the application of air under pressure and exhaust alternately to the head and rod ends of the cylinder 18. As shown in FIGURE 2, the piston 27 comprises a pair of leather cups mounted in an alternate stacked arrangement with a plurality of steel discs on the rearward end of the piston rod 28. The ports for admitting air to the rod and head ends of the cylinder 18 are not shown as these may take any well known form and may for example be formed through the plates 16 and 17. An elastomer bumper 30 is provided at the rod end of the cylinder 18 and about the piston rod 28 to cushion the shock of the piston 27 in bottoming at the rod end of the cylinder 18. Air leakage from the cylinder 18 and about the surface of the piston rod 28 is effectively prevented by a sealing ring assembly 31 carried in the plate 17 and about the piston rod 28. The sealing ring assembly 31 is maintained in air sealing position by a bushing 32 disposed on the piston rod 28 and threaded into the forward side of the plate 17.

The movable jaw 11 is slidably carried on a pair of rods 33. The rods 33 are secured in a parallel spaced apart relationship to each other between the plate 17 and the base member 34 of the stationary jaw 12. As may be seen in the drawings, the base member 34 of the stationary jaw 12 is shaped substantially as a rectangular bar. The base member 34 is secured to the upper surface of the base plate 14 transversely thereof by dowel means 35. The forward end of each of the rods 33 is threaded into suitable tapped holes in the base member 34 of the stationary jaw 12, and the rearward ends of the rods 33 extend through the plate 17. Screws 36 applied through the upper surface of the plate 17 engage the portions of the rods 33 extending through the plate 17 to firmly lock the rods 33 in the plate 17.

The base portion 37 of the movable jaw 11 is provided with a pair of holes formed therethrough which carry bushings 38 permitting the base portion 37 to freely slide on the rods 33. The forward end of the piston rod 28 is threaded into the base member 37 of the movable jaw 11 and secured therein by a nut 40. Thus it may be seen that as the air cylinder assembly 10 is operated, the movable jaw 11 will be moved longitudinally of the rods 33 with the forward limit of movement of the movable jaw 11 being determined by the bumper 30.

The rearward limit of movement of the movable jaw 11 is determined by a stroke adjustment bar 41. The stroke adjustment bar 41 comprises a substantially rectangular bar with an opening formed through each end thereof. The openings are spaced apart a distance substantially equal to the spacing of the rods 33 thereby permitting the stroke adjustment bar 41 to be slidably carried on the rods 33. Each end of the stroke adjustment bar 41 is provided with a slot cut into the openings for the rods 33. A fastener 42 is journaled through each end portion of the stroke adjustment bar 41 above the slot and is threaded into the end portion of the stroke adjustment bar below the slot thereby permitting the stroke adjustment bar 41 to be clamped to the rods 33 by an appropriate tightening of the fasteners 42 to effectively reduce the diameter of the openings for the rods 33. The stroke adjustment bar 41 further carries a vernier adjustment assembly of a bolt 43 and a nut 44. The bolt 43 is threaded horizontally through the stroke adjustment bar 41 between the rods 33 with the head of the bolt 43 extending toward the base member 37 of the movable jaw 11. The nut 44 is threaded on the bolt 43 to lock the bolt 43 in any selected position. The movable jaw 11 in moving rearwardly on its return stroke will be stopped when the base member 37 of the movable jaw 11 engages the head of the bolt 43. The return stroke limit of the movable jaw 11 is set by first loosening the fasteners 42 and sliding the stroke adjustment bar 41 along the rods 33 to the approximate desired limit. The fasteners 42 are then tightened to clamp the stroke adjustment bar 41 to the rods 33. The nut 44 is then loosened and the bolt 43 threaded inwardly or outwardly of the stroke adjustment bar 41 to arrive at the exact desired limit of the return stroke of the movable jaw 11. The nut 44 is then tightened to complete the setting of the return stroke for the movable jaw 11.

The movable jaw 11 in addition to the base member 37 comprises two stock gripping or clamping members, a fixed jaw member 46 and a selectively fixed jaw member 47. The fixed jaw member 46 is secured at one end of the base member 37 to upstand therefrom by any means such as welding. The fixed jaw 46 thus provides one vertically disposed clamping surface which is parallel to the axis of reciprocation of the air cylinder assembly 10.

The selectively fixed jaw member 47 of the movable jaw 11 comprises a face plate member 48, a backup member 49 and a bladder 50 which may be seen in FIGURE 4. The backup member 49 is a substantially rectangularly shaped block having a centrally disposed depending flange portion 49a which may be particularly seen in FIGURE 1. The depending flange portion 49a of the backup member 49 is of a width substantially equal to the width of a slot 37a formed in the upper surface of the base member 37. The slot 37a is positioned longitudinally and centrally of the upper surface of the base member 37. The underside of the base member 37 is also provided with a slot 37b. The slots 37a and b are in substantial vertical alignment with the slot 37b having a width greater than the width of the slot 37a. The base member 37 is further provided with an opening 37c extending between the two slots 37a and b. The described arrangement of the slots 37a and 37b and the opening 37c provide for the selective longitudinal positioning of the backup member 49 on the upper surface of the base member 37. This is accomplished by a stud 52 which depends from the underside of the backup member 49 through the opening 37c and below the base member 37. A rectangular plate 53 having a hole therethrough is positioned on the lower end of the stud 52 and within the confines of the slot 37b and is maintained therein by a nut 54 threaded onto the lower end of the stud 52. Thus it may be seen that by loosening the nut 54, the backup member 49 may be slid in the slot 37a of the base member 37 to any desired position longitudinally thereof and the backup member 47 will be secured in the selected position upon the tightening of the nut 54. It should be noted that the opening 37c in the base member 37 has a length less than the spacing between the rods 33.

The face plate member 48 of the selectively fixed jaw member 47 of the movable jaw 11 is shaped substantially as a rectangular box without a bottom or a back wall. The face plate member 48 is mounted on the backup member 49 and comprises a clamping surface 48a, a top wall 48b and a pair of side walls 48c. The clamping surface 48a is substantially greater in thickness than the top and side walls of the face plate member 48. As may be seen in FIGURE 4, the space between the forward side of the backup member 49 and the rearward side of the clamping surface 48a of the face plate member 48 is occupied by the bladder 50. It should be noted that the aforedescribed construction of the backup member 49 and the face plate member 48 provide for a bladder area which is only slightly less than the area of the clamping surface 48a. This important feature provides that for a given air pressure delivered to the bladder 50, the clamping force will be substantially the product of the delivered air pressure and the area of the clamping surface 48a.

In further describing the construction of the movable jaw 11 it may be noted that the details of the bladder construction and the detailed arrangement by which the base plate member 48 and the backup member 49 are maintained in cooperation are substantially identical except for size to the corresponding constructions in the stationary jaws 12 and 13 and it is believed that a detailed description of the construction of the stationary jaws 12 and 13 will aid in understanding those construction details in the movable jaw 11. The selectively fixed jaw members of the stationary jaws 12 and 13 are respectively designated 57 and 58. The selectively fixed jaw member 57 comprises a face plate member 60, a backup member 61, and a bladder 62 corresponding to the similar elements in the selectively fixed jaw member 47 of the movable jaw 11. In the case of the selectively fixed jaw member 58 of the stationary jaw 13, the face plate member is designated 63, the backup member is designated 64 and the bladder is designated 65. Considering the detailed construction of the selectively fixed jaw member 58 of the stationary jaw 13 which is shown in side elevation in FIGURE 3 in addition to the views shown in the other figures, it may be seen that the side walls of the face plate member 63 are each provided with a pair of slots 67 which are disposed in a vertically spaced relationship and with the long axis thereof disposed horizontally. The backup member 64 is provided with a pair of openings therethrough with one opening being aligned with the upper slots 67 and with the lower opening in alignment with the lower slots 67. A pin 68 is positioned through each of the openings in the backup member 64, and each pin 68 has a length sufficient to permit the ends of the pins 68 to extend into the slots 67. The pins 68 are secured in the backup member 64 by a pair of screws 70 which are threaded into the rear surface of the backup member 64 perpendicularly to the axes of the pins 68. It should be understood that the same construction exists in the movable jaw 11 and the stationary jaw 12. In the movable jaw 11 the pins corresponding to pins 68 are designated 71, and in the stationary jaw 12 the pins corresponding to pins 68 are designated 72. In the movable jaw 11 the screws corresponding to screws 70 are designated 73, and in the stationary jaw 12 those screws are designated 74.

The bladder 65 of the selectively fixed jaw member 58 of the stationary jaw 13 is formed of an elastomer hose material. A section of hose of a length substantially equal to the distance between the side walls of the face plate member 63 is provided and an opening is formed through the surface of the hose section substantially centrally thereof. The hole in the hose section admits the stem member 76 which may be seen in FIGURE 3. The hose material is selected of a natural diameter such that when the hose section is pressed into a flattened condition, the flattened width of the hose is substantially equal to the height of the backup member 64. This collapsed condition of the hose section is particularly shown in FIGURES 3 and 4. The open ends of the hose section are sealed by clamping members 77 which are substantially C-shaped in cross section as may be seen in FIGURE 4. The completed bladder 65 is positioned against the forward face of the backup member 64 with the stem member 76 extending into a hole formed through the backup member 64 as shown in FIGURE 3. A threaded bushing member 78 is then inserted from the rearward side of the backup member 64 into the hole therethrough and threaded onto the stem member 78 to draw the stem member into air sealing relationship with one side of the bladder 65. An air conduit coupling 80 is threaded into the bushing 78 for delivering air from an air conduit 81 to the bladder 65. The face plate member 63 is then mounted on the backup member 64 with the rearward side of the clamping face of the face plate member 63 against the bladder 65. The pins 68 are then inserted through the slots 67 and the appropriate holes in the backup member 64, and the screws 70 are threaded into the backup member 64 to secure the pins 68 in place. It should be understood that the aforedescribed construction of the bladder 65 is substantially the same for the movable jaw 11 and the stationary jaw 12. In the movable jaw 11 the clamping members corresponding to the C-shaped clamping members 77 are designated 82, and those members in the stationary jaw 12 are designated 83. The stem member and the threaded bushing in the movable jaw 11 which correspond to the stem member 76 and the bushing member 78 are respectively designated 84 and 85, and those corresponding members in the stationary jaw 12 are respectively designated 86 and 87. The air conduit and coupling for delivering air to the bladder 50 of the movable jaw 11 are respectively designated 88 and 89, and the air conduit and coupling for delivering air to the bladder 62 in the stationary jaw 12 are respectively designated 90 and 91. Portions of the various air conduits and couplings have been removed in some of the views to aid in a showing of the construction of the present embodiment. The stationary jaws 12 and 13 which are intended to be operated substantially simultaneously are supplied with air from coupling 93 into which the air conduits 81 and 90 are connected. The coupling 93 is secured to a plate 94 which in turn is secured to the underside and at one end of the base members of the stationary jaws 12 and 13 as may be seen in FIGURES 2 and 3.

The arrangements by which the selectively fixed jaw members 57 and 58, respectively of jaws 12 and 13, are selectively secured in any adjusted position are different from that previously described for the selectively fixed jaw member 47 of the movable jaw 11. The base member 34 of the stationary jaw 12 is formed as a substantially rectangular bar with a rabbet portion 34a on one lower side thereof. The base member 95 of the stationary jaw 13 is substantially a mirror image of the base member 34 with a rabbet portion 95a. The rabbet portion 95a is clearly shown in side elevation in FIGURE 3. The base member 95 of the stationary jaw 13 is secured to the base plate 14 in a spaced relationship to base member 34 by any means such as bolts 96. The spacing between the base members 34 and 95 is selected to permit a tool such as a saw to enter therebetween. The backup members 61 and 64 of the stationary jaws 12 and 13 respectively, are each formed to have a depending flange with a turned lower edge permitting the backup members 61 and 64 to slide along the upper surface of the base members 34 and 95 with the turned lower edge of the backup members 61 and 64 extending into the rabbet portions 34a and 95a respectively of the base members 34 and 95. This cooperation of the backup members 61 and 64 with the base members 34 and 95 is clearly shown in FIGURE 1. FIGURE 3 shows the depending flange portion of the backup member 64 of the movable jaw 13 in side elevation. This described arrangement of the backup members 61 and 64 and the base members 34 and 95 presents the forward faces of the face plate members 60 and 63 as vertical clamping surfaces similar to the vertical clamping surface 48a of the movable jaw 11. These vertically disposed clamping surfaces of the face plate members 60 and 63 cooperate with the fixed jaw members of the stationary jaws 12 and 13 in clamping any stock. The fixed jaw member 97 of the stationary jaw 12 is secured to the upper surface of the base member 34 by any means such as welding, and the fixed jaw member 98 of the stationary jaw 13 is secured in a similar manner to the upper surface of the base member 95.

The selectively fixed jaw members 57 and 58 of the stationary jaws 12 and 13 respectively are selectively secured in any desired spaced position relative to the fixed jaw members 97 and 98 by a pair of bolts, bolt 100 for the stationary jaw 12 and bolt 101 for the stationary jaw 13. Considering the movable jaw 13, the bolt 101 is journaled through the depending flange portion of the backup member 64 and through a horizontally disposed slot or opening 102 formed through the base member 95. The side of the slot or opening 102 opposite from that engaged by the depending flange portion of the backup member 64 is enlarged to accommodate a nut member 103. The bolt 101 is threaded into the nut member 103 to secure the backup member 64 and consequently the selectively fixed jaw member 58 to the base member 95. The length of the slot or opening 102 provides for selective adjustment of the selectively fixed jaw member 58 through a range comparable to that of the selectively fixed jaw member 47 of the movable jaw 11. The base member 34 of the stationary jaw 12 is provided with a slot or opening corresponding to slot 102 and the bolt 100 is provided with a nut member corresponding to nut member 103 to provide adjustment of jaw 12 in a manner similar to jaw 13.

In adjusting the jaws 11, 12 and 13 to feed and clamp any particular width of stock, the nut 54 of jaw 11, bolt 100 of jaw 12 and bolt 101 of jaw 13 are loosened. With the stock between the vertically positioned stock gripping surfaces of the jaw members of each of the jaws 11, 12 and 13, the selectively fixed jaw members 47, 57 and 58 are moved in engagement with the stock until the pins 71, 72 and 68 respectively of jaws 11, 12 and 13 are positioned at the forward ends of the cooperating slots in the face plate members 48, 60 and 63. The nut 54 is then tightened as are the bolts 100 and 101. It may be seen that if air under pressure is then delivered to air conduits 88, 90 and 81, the respective bladders 50, 62 and 65 of the jaws 11, 12 and 13 will be expanded to move the face plate members 48, 60 and 63 to securely clamp the stock against the fixed jaw members 46, 97 and 98. Upon the exhaust of the air under pressure in the bladders 50, 62 and 65, the stock is free to slide between the cooperating jaw members of the jaws 11, 12 and 13.

FIGURE 3 by a number of dotted lines designated 105 shows a plurality of tapped holes in the stock gripping surfaces of the face plate member 63 and the fixed jaw member 98 of the stationary jaw 13. These tapped holes are provided for the attachment of any desired type of jaw liner, and it is to be understood that the movable jaw 11 and the stationary jaw 12 are also provided with jaw liner attaching means.

Having described the invention what is considered new and desired to be protected by Letters Patent is:

1. In a stock feed and vise arrangement, a base plate, a reciprocating air cylinder and piston assembly carried on one end of sad base plate, a pair of stationary jaws, each of said stationary jaws comprising a base member and stock gripping means carried on said base member, the base members of said stationary jaws being carried on said base plate in a spaced apart relationship to each other and transversely of the axis of reciprocation of said air cylinder and piston assembly, a pair of rods, said rods carried in a parallel spaced apart relationship to each other between said cylinder and piston assembly and the base member of one of said stationary jaws, a movable jaw comprising a base member and stock gripping means carried on said base member, the base member of said movable jaw being journaled on said pair of rods, the piston rod of said air cylinder and piston assembly being connected to said base member of said movable jaw, and each of said stock gripping means of said stationary and movable jaws being formed to define cooperating stock gripping surfaces disposed in parallel planes perpendicular to a plane which includes the longitudinal axes of said pair of rods.

2. In a stock feed and vise arrangement as defined in claim 1, wherein said stock gripping means carried on said base members of each of said stationary jaws and said movable jaw comprises air responsive means moving one of said cooperating stock gripping surfaces toward the other of said cooperating stock gripping surfaces.

3. In a stock feed and vise arrangement as defined in claim 1, stroke adjustment means for selectively limiting the return stroke of said movable jaw away from said pair of stationary jaws, said stroke adjustment means comprising a stroke adjustment bar journaled on said pair of rods between said movable jaw and said air cylinder piston assembly, means on said stroke adjustment bar for clamping said stroke adjustment bar in any selected position on said pair of rods, and vernier adjustment means carried on said stroke adjustment bar and engageable by the base member of said movable jaw on the return stroke of said movable jaw.

4. In a stock feed and vise arrangement as defined in claim 3, wherein said vernier adjustment means comprises a bolt threaded horizontally through said stroke adjustment bar intermediate the ends thereof with one end of said bolt extending toward said base member of said movable jaw, and a lock nut carried on said bolt for locking said bolt in any selected threaded position through said stroke adjustment bar.

5. In a stock feed and vise arrangement, a base plate, a reciprocating air cylinder and piston assembly carried on one end of said base plate, a pair of stationary jaws, each of said stationary jaws comprising a base member and stock gripping means carried on said base member, the base members of said stationary jaws being carried on said base plate in a spaced apart relationship to each other and transversely of the axis of reciprocation of said air cylinder and piston assembly, said stock gripping means of said stationary jaws comprising a fixed jaw member carried on one end of each of said base members of said stationary jaws and a selectively positioned jaw member carried on each base member of said stationary jaws and selectively positionable in a spaced relationship to said fixed jaw members to accommodate stock of different widths, a pair of rods, said rods carried in a spaced apart relationship to each other between said cylinder and piston assembly and the base member of one of said stationary jaws, a movable jaw comprising a base member and stock gripping means carried on said base member, the base member of said movable jaw being journaled on said pair of rods for sliding movement therealong, said stock gripping means of said movable jaw comprising a fixed jaw member carried on one end of said base member of said movable jaw and aligned with said fixed jaw members of said pair of stationary jaws along an axis parallel to the axis of reciprocation of said air cylinder and piston assembly, said stock gripping means of said movable jaw further comprising a selectively positioned jaw member carried on said base member and selectively positionable in a spaced relationship to said fixed jaw member of said movable jaw to accommodate stock of different widths, the piston rod of said air cylinder and piston assembly being connected to said base member of said movable jaw, and said stationary and movable jaws further being formed so that the jaw members of each of the stock gripping means thereof provide cooperating stock gripping surfaces disposed in parallel planes perpendicular to a plane which includes the longitudinal axes of said pair of rods.

6. In a stock feed and vise arrangement as defined in claim 5, wherein each of said selectively positioned jaw members of said stationary and movable jaws comprises a selectively positioned support member, and means in each of said selectively positioned jaw members of said stationary and movable jaws for moving a portion thereof which includes one of said cooperating stock gripping surfaces toward said fixed jaw members responsive to air under pressure delivered to said support members of said stationary and movable jaws.

7. In a stock feed and vise arrangement as defined in claim 6, wherein said means in each of said selectively positioned jaw members of said stationary and movable jaws for moving a portion thereof toward said fixed jaw members comprises a bladder expanding responsive to air under pressure delivered to said support member thereof to move said portion toward said fixed jaw member, said one of said cooperating stock gripping surfaces of said stationary and movable jaws each defining a stock gripping surface of a certain area, and the area over which each of said bladders directly applies pressure to move said portion toward said fixed jaw member being substantially equal to the respective certain area of each of said stock gripping surfaces of a certain area.

8. In a stock feed and vise arrangement, a base plate, a reciprocating air cylinder and piston assembly carried on one end of said base plate, a pair of stationary jaws, each of said stationary jaws comprising a base member and stock gripping means carried on said base member, the base members of said stationary jaws being carried on said base plate in a spaced apart relationship to each other and transversely of the axis of reciprocation of said air cylinder and piston assembly, said base members and said stock gripping means of said pair of stationary jaws being formed to permit a tool to work any stock gripped by said stock gripping means between said stock gripping means and said base members of said pair of stationary jaws, a pair of rods, said rods carried in a parallel spaced apart relationship to each other between said cylinder and piston assembly and the base member of one of said stationary jaws, a movable jaw comprising a base member and stock gripping means carried on said base member, the base member of said movable jaw being journaled on said pair of rods, the piston rod of said air cylinder and piston assembly being connected to said base member of said movable jaw, and each of said stock gripping means of said stationary and movable jaws being formed to define cooperating stock gripping surfaces disposed in parallel planes perpendicular to a plane which includes the longitudinal axes of said pair of rods.

9. In a stock feed and vise arrangement as defined in claim 8, wherein said stock gripping means carried on said base members of said stationary and movable jaws comprises a fixed jaw member and an air operated jaw member having a selectively positioned support member.

10. In a stock feed and vise arrangement, a rectangular base plate having a length substantially greater than the width thereof, a reciprocating air cylinder and piston assembly comprising a pair of end plates carried at each end of an air cylinder, and a piston and rod slidably carried in said air cylinder with said rod journaled through one of said end plates, said one of said end plates secured at one end of said base plate to upstand therefrom perpendicularly to the longitudinal axis of said base plate, a pair of stationary jaws, each of said stationary jaws comprising a base member and stock gripping means carried on the upper side of said base member, the base members of said stationary jaws being carried on said base plate at the other end thereof in a spaced apart relationship to each other and transversely of the longitudinal axis of said base plate, a pair of rods, said rods carried in a parallel spaced apart relationship to each other between said one end plate and the base member of one of said stationary jaws, a movable jaw comprising a base member and stock gripping means carried on the upper side of said base member, the base member of said movable jaw being journaled on said pair of rods, the piston rod of said air cylinder and piston assembly being connected to said base member of said movable jaw, and each of said stock gripping means of said stationary and movable jaws defining cooperating stock gripping surfaces disposed in parallel planes perpendicular to a plane which includes the longitudinal axes of said pair of rods.

11. In a stock feed and vise arrangement as defined in claim 10, a stroke adjustment bar for limiting the return stroke of said movable jaw away from said pair of stationary jaws, said stroke adjustment bar adjustably secured to said pair of rods and carrying means engageable by the base member of said movable jaw to limit the movement of said movable jaw on the return stroke thereof.

12. In a stock feed and vise arrangement as defined in claim 10, wherein the stock gripping means of each of said jaws comprises a fixed jaw member carried at one end of the base member and providing one of said stock gripping surfaces, and an air operated jaw member providing the other of said stock gripping surfaces and having a selectively positioned support member carried on said base member.

13. In a stock feed and vise arrangement as defined in claim 12, wherein each of said air operated jaw members comprises said support member and a second member, means mounting said second member in cooperation with said support member for guided movement of said second member relative to said support member toward and away from said fixed jaw member, a bladder carried between said support and second members, and means for delivering air to said bladder to expand said bladder to move said second member away from said support member and toward said fixed jaw member.

14. In a stock feed and vise arrangement as defined in claim 13, wherein the side of each of said second members disposed toward each of said fixed jaw members comprises a stock gripping surface of a certain area, and wherein the area over which each of said bladders directly applies pressure to move said second member toward said fixed jaw member is substantially equal to the area of said stock gripping surface of the cooperating ones of said second members.

15. In a stock feed and vise arrangement as defined in claim 13, wherein the base member of each of said jaws is provided with a longitudinally extending slot formed therethrough between the axes of said pair of rods, and clamping means carried on each of said support members and extending through said slot for selectively clamping each of said support members on said base members.

16. In a stock feed and vise arrangement as defined in claim 15, wherein said slot formed through said base member of said movable jaw extends from the upper surface to the lower surface thereof, wherein said clamping means for said movable jaw comprises a stud depending from the underside of said support member thereof and through said slot to the underside thereof, a plate and a nut, said plate carried on the lower end of said stud in engagement with the underside of said base member of said movable jaw, and said nut threaded onto the lower end of said stud and against the underside of said plate whereby said support member is clamped to the upper surface of said base member of said movable jaw responsive to a tightening of said nut.

17. In a stock feed and vise arrangement as defined in claim 16, wherein said slot through said base member of each said stationary jaw is formed to extend horizontally from one side of said base members to the other side thereof, said support members of each of said stationary jaws having a depending flange extending along one side of said base member thereof, a pair of bolts, each of said bolts journaled through said depending flange of one of said support members and extending horizontally through said slot in one of said base members of said stationary jaws, a pair of nuts each of said nuts threaded on the extending end of one of said bolts and engaging the other side of said base members whereby said support member of each of said stationary jaws is secured to the upper side of said base member responsive to a tightening of said nut.

18. In a stock feed and vise arrangement, a rectangular base plate having a length substantially greater than the width thereof, a reciprocating air cylinder and piston assembly, the rod end of the cylinder portion of said air cylinder and piston assembly being carried on one end of said base plate with the piston rod of said air cylinder and piston assembly extending longitudinally and over said base plate, each of said stationary jaws comprising a base member and stock gripping means carried on the upper side of said base member, the base members of said stationary jaws being carried on said base plate at the other end thereof in a spaced apart relationship to each other and transversely of the longitudinal axis of said base plate, a pair of rods, said rods carried in a parallel spaced apart relationship to each other between said rod end of said air cylinder and the base member of one of said stationary jaws, a movable jaw comprising a base member and stock gripping means carried on the upper side of said base member, the base member of said movable jaw being journaled on said pair of rods, the piston rod of said air cylinder and piston assembly being connected to said base member of said movable jaw between said pair of rods, each of said stock gripping means of said stationary and movable jaws comprising a fixed jaw member and an air operated jaw member having a selectively positioned support member, each of said fixed jaw members being carried on one end of one of said base members and in alignment with each other on a line parallel to the longitudinal axis of said base plate, the base member of said movable jaw having a slot extending vertically therethrough between said rods, said support member of said movable jaw having a stud depending from the underside thereof and extending through said slot in said base member of said movable jaw, and means on the lower end of said stud engaging the underside of said base member of said movable jaw for clamping said support member thereof in any selected position longitudinally of said slot, said base members of said stationary jaws each having a slot extending horizontally therethrough between said rods, the support member of each of said stationary jaws having a depending flange, said depending flanges extending downwardly of the outwardly spaced sides of said base members of said stationary jaws, and clamping means carried on each of said depending flanges and extending through said slots of said base members of said stationary jaws for selectively clamping said support members thereof on said base members of said stationary jaws at any selected position longitudinally of said slots.

References Cited in the file of this patent

UNITED STATES PATENTS

| | | |
|---|---|---|
| 1,219,935 | Gorton | Mar. 20, 1917 |
| 2,096,073 | Spencer | Oct. 19, 1932 |
| 2,622,874 | Haller | Dec. 23, 1952 |
| 2,657,046 | Tallis | Oct. 27, 1953 |
| 2,978,160 | Bunnell | Apr. 4, 1961 |
| 3,038,647 | Grimm | June 12, 1962 |